US012750113B2

(12) United States Patent
Rahman et al.

(10) Patent No.: US 12,750,113 B2
(45) Date of Patent: Sep. 29, 2026

(54) CORRELATION MODEL FOR A FREQUENCY RANGE 2 MULTI-RECEIVER SYSTEM WITH SIMULTANEOUS RECEPTION

(71) Applicant: QUALCOMM Incorporated, San Diego, CA (US)

(72) Inventors: Md Jahidur Rahman, San Diego, CA (US); Changhwan Park, San Diego, CA (US); Jae Ho Ryu, San Diego, CA (US); Lei Xiao, San Jose, CA (US); Vasanthan Raghavan, West Windsor Township, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 454 days.

(21) Appl. No.: 18/356,002

(22) Filed: Jul. 20, 2023

(65) Prior Publication Data

US 2025/0030472 A1 Jan. 23, 2025

(51) Int. Cl.
*H04B 7/06* (2006.01)
*H04B 7/024* (2017.01)
*H04B 7/0413* (2017.01)
*H04B 7/0456* (2017.01)

(52) U.S. Cl.
CPC ............. *H04B 7/063* (2013.01); *H04B 7/024* (2013.01); *H04B 7/0413* (2013.01); *H04B 7/0456* (2013.01); *H04B 7/0634* (2013.01)

(58) Field of Classification Search
CPC .................................................. H04B 7/06956
See application file for complete search history.

(56) References Cited

U.S. PATENT DOCUMENTS

2022/0224464 A1 7/2022 Rakib
2022/0352933 A1* 11/2022 Rakib ................... H04L 5/0023
2023/0063345 A1* 3/2023 Zander ................. H04B 7/0413

FOREIGN PATENT DOCUMENTS

EP 3531596 B1 * 1/2022 .......... H04W 72/541

OTHER PUBLICATIONS

3GPP TS 38.101-4 titled 5G; NR; User Equipment (UE) radio transmission and reception; Part 4: Performance requirements (Year: 2023).*
Ericsson Technology Review 5G Evolution Toward 5G Advanced (Year: 2023).*

* cited by examiner

*Primary Examiner* — Peter P Chau
*Assistant Examiner* — Christopher R Davis
(74) *Attorney, Agent, or Firm* — QUALCOMM Incorporated

(57) ABSTRACT

Certain aspects of the present disclosure provide techniques for processing multi-layer transmissions simultaneously received from multiple network entities. An example method for wireless communications by a user equipment (UE) includes obtaining a first channel matrix for spatially processing multi-layer transmissions from a first network entity received via a first antenna panel at the UE; obtaining a second channel matrix for spatially processing multi-layer transmissions from a second network entity received via a second antenna panel at the UE; and spatially processing one or more multi-layer transmissions from the first and second network entities simultaneously received via the first and second antenna panels at the UE, based on a third channel matrix including entries of the first channel matrix and entries of the second channel matrix.

18 Claims, 9 Drawing Sheets

CORRELATION MODEL FOR A FREQUENCY RANGE 2 MULTI-RECEIVER SYSTEM WITH SIMULTANEOUS RECEPTION

BACKGROUND

Field of the Disclosure

Aspects of the present disclosure relate to wireless communications, and more particularly, to techniques for processing multi-layer transmissions simultaneously received from multiple network entities.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communications by a user equipment (UE). The method includes obtaining a first channel matrix for spatially processing multi-layer transmissions from a first network entity received via a first antenna panel at the UE; obtaining a second channel matrix for spatially processing multi-layer transmissions from a second network entity received via a second antenna panel at the UE; and spatially processing one or more multi-layer transmissions from the first and second network entities simultaneously received via the first and second antenna panels at the UE, based on a third channel matrix including entries of the first channel matrix and entries of the second channel matrix.

Other aspects provide: an apparatus operable, configured, or otherwise adapted to perform any one or more of the aforementioned methods and/or those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

DETAILED DESCRIPTION

Figure 1:
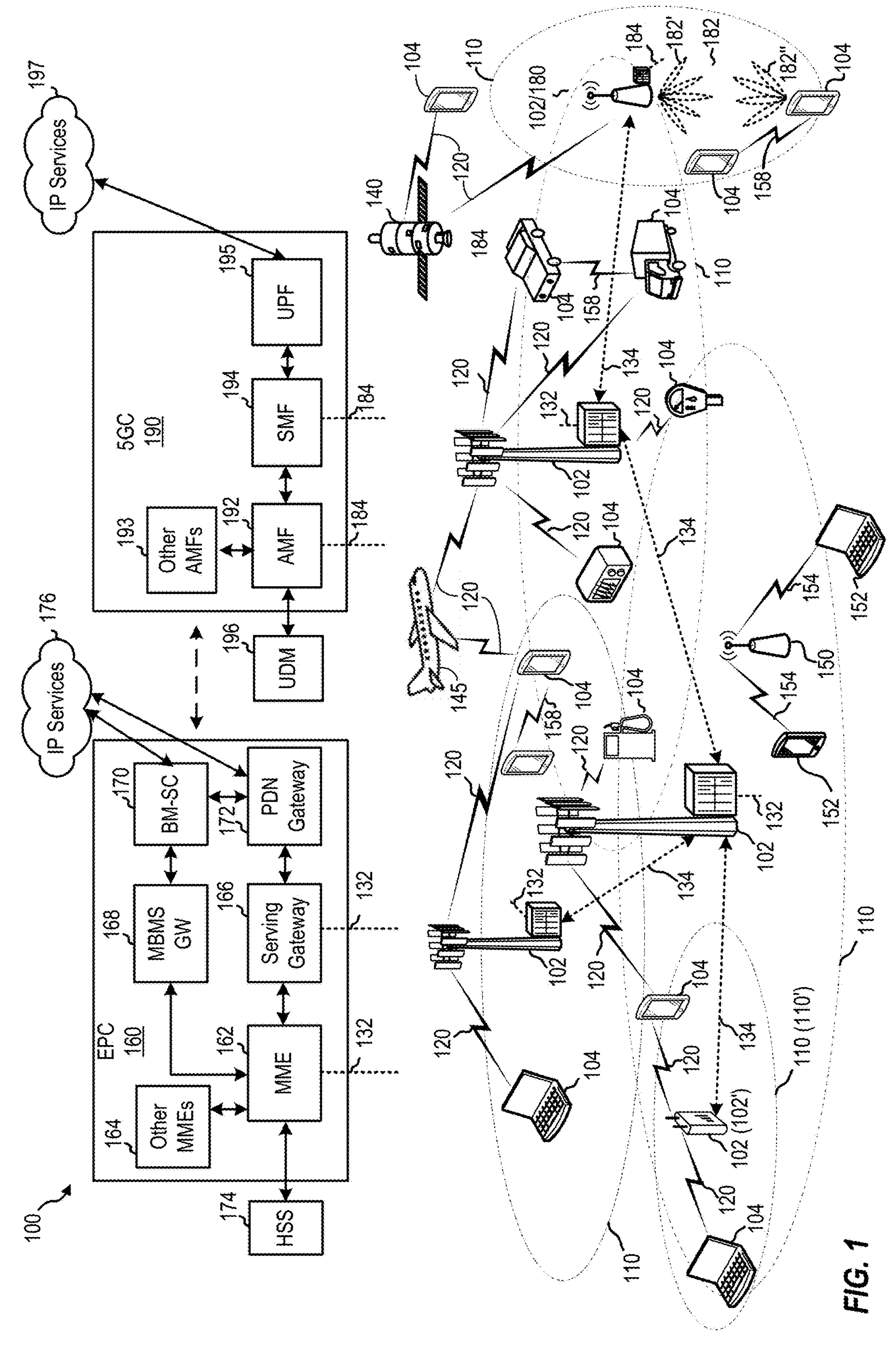
FIG. 1 depicts an example wireless communications network.

Aspects of the present disclosure provide apparatuses, methods, processing systems, and computer-readable mediums for processing multi-layer transmissions simultaneously received from multiple network entities.

New radio (NR) communications systems may utilize multiple transmit antennas and receive antennas to communicate with additional layers, wherein a signal is split into multiple streams and each stream is transmitted from a different transmit antenna (or set of antennas) in the same frequency channel. A receiver with multiple antennas may separate the streams into parallel channels, thus enabling more data to be sent in one frequency channel of wireless communications systems using the additional layers. For multi-layer communications, it is important to study correlation models so as to analyze a receiver's ability to process a multi-layer communication transmitted from a single direction. Additionally, NR communications systems may use multiple transmission reception points (TRPs) to improve communications through the use of spatial diversity, where transmitting signals from different locations enables receivers to receive separate signals in a frequency channel, enabling more data to be sent in one frequency channel. However, for up to 4-layer reception for which a UE will receive simultaneous transmissions from at least two directions (e.g., from multiple network entities, such as TRPs), existing specifications do not provide a correlation model in the context of FR2, where simultaneous reception at multiple (e.g., two) UE antenna panels may enable up to four-layer reception.

In aspects of the present disclosure, a device (e.g., a UE) may determine a correlation matrix for spatially processing multi-layer transmissions simultaneously received from at least two directions via multiple antenna panels of the UE. The UE can calculate the correlation matrix for spatially processing multi-layer transmissions simultaneously received from at least two directions via multiple antenna panels based on correlation matrices for multi-layer transmission received from a single network (e.g., a single TRP). For example, a UE with four antennas can calculate a correlation matrix for spatially processing a 4-layer transmission received from two TRPs, each transmitting from two transmit antennas, based on: two 2×2 channel matrices, each channel matrix representing a channel of an intended transmission from one of the two TRPs to an intended pair of receive antennas of the UE; and two 2×2 cross-talk matrices, each cross-talk matrix representing a channel of a cross-talk (i.e., interfering) transmission from one of the two TRPs to the other (i.e., unintended) pair of receive antennas of the UE.

Determining a correlation matrix for spatially processing multi-layer transmissions simultaneously received from at least two directions via multiple antenna panels may enable a device to spatially process multi-layer transmissions simultaneously received from at least two directions, enabling higher bandwidth and more reliable communications in wireless communications systems.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and user equipments.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
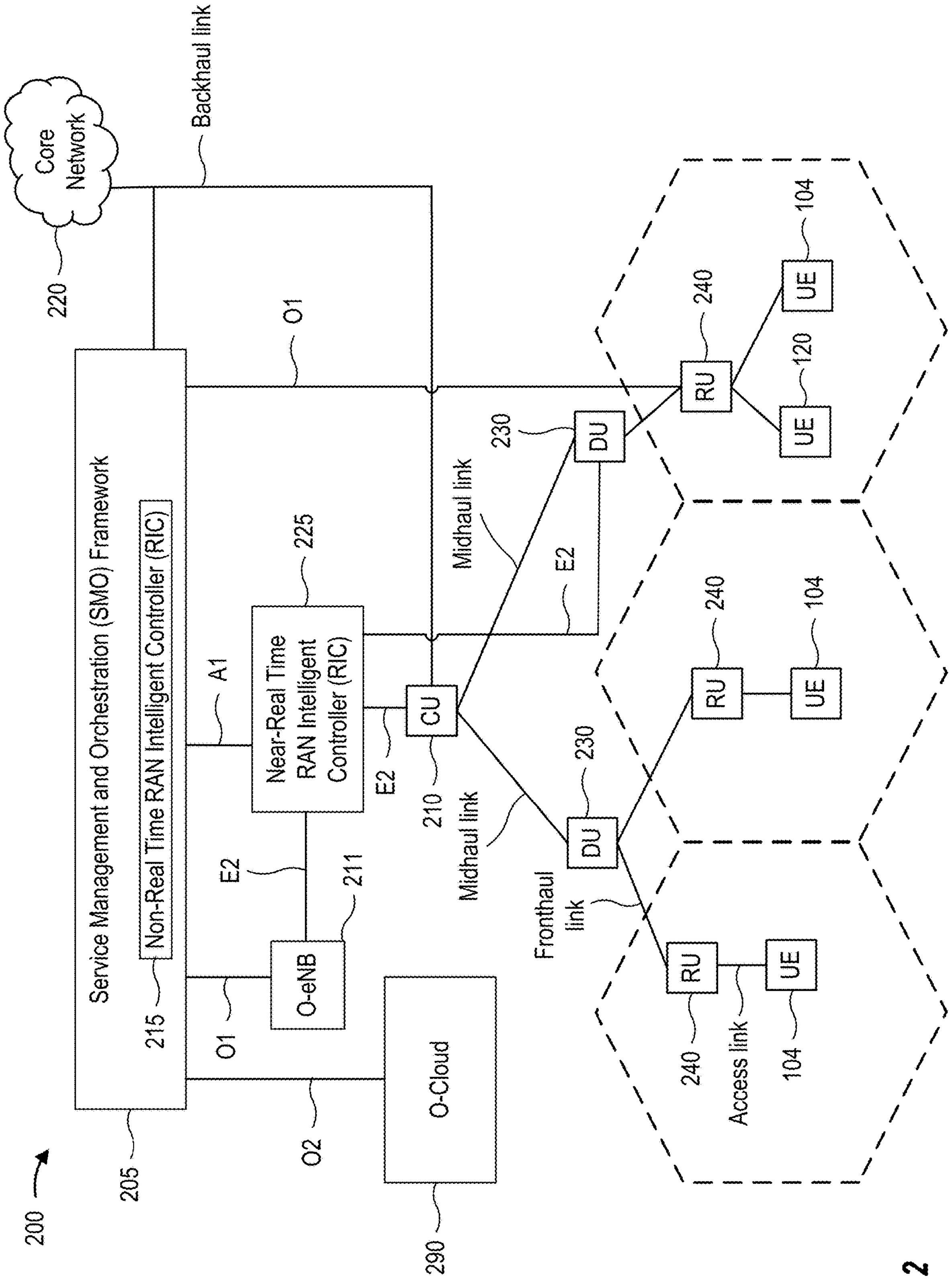
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHZ-7125 MHz, which is often referred to (interchangeably) as "Sub-6 GHz". Similarly, 3GPP currently defines Frequency Range 2 (FR2) as including 24,250 MHz-71,000 MHZ, which is sometimes referred to (interchangeably) as a "millimeter wave" ("mmW" or "mmWave"). In some cases, FR2 may be further defined in terms of sub-ranges, such as a first sub-range FR2-1 including 24,250 MHz-52,600 MHz and a second sub-range FR2-2 including 52,600 MHz-71,000 MHz. A base station configured to communicate using mm Wave/near mm Wave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QOS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUS) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUS 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUS 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via 01) or via creation of RAN management policies (such as A1 policies).

Figure 3:
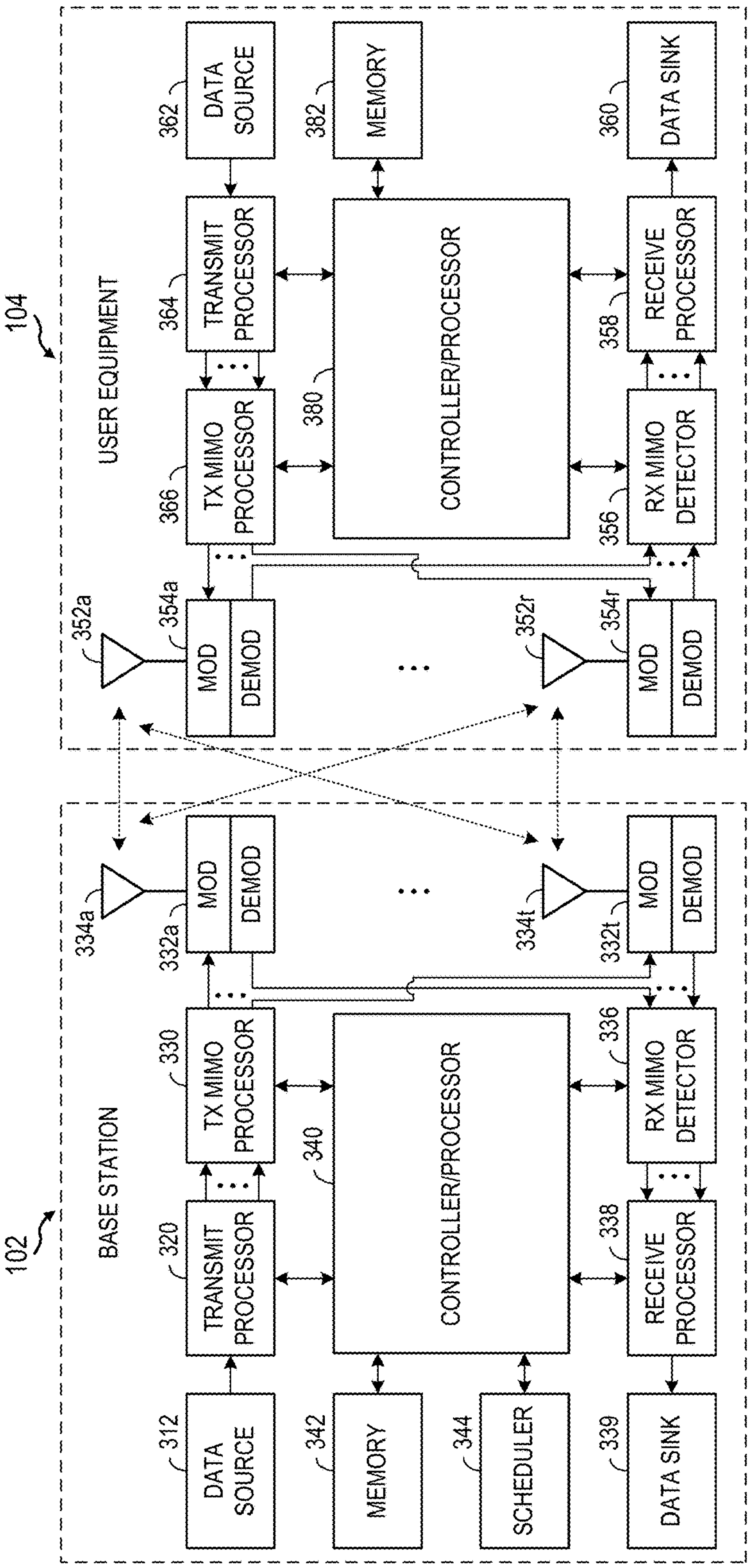
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334*a-t* (collectively 334), transceivers 332*a-t* (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352*a-r* (collectively 352), transceivers 354*a-r* (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332*a*-332*t*. Each modulator in transceivers 332*a*-332*t* may process a respective output symbol stream to obtain an output sample stream. Each modulator may further process (e.g., convert to analog, amplify, filter, and upconvert) the output sample stream to obtain a downlink signal. Downlink signals from the modulators in transceivers 332*a*-332*t* may be transmitted via the antennas 334*a*-334*t*, respectively.

In order to receive the downlink transmission, UE 104 includes antennas 352*a*-352*r* that may receive the downlink signals from the BS 102 and may provide received signals to the demodulators (DEMODs) in transceivers 354*a*-354*r*, respectively. Each demodulator in transceivers 354*a*-354*r* may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354*a*-354*r*, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354*a*-354*r* (e.g., for SC-FDM), and transmitted to BS 102.

At BS 102, the uplink signals from UE 104 may be received by antennas 334*a-t*, processed by the demodulators in transceivers 332*a*-332*t*, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332*a-t*, antenna 334*a-t*, and/or other aspects described herein. Similarly, "receiving" may refer to various mechanisms of obtaining data, such as obtaining data from antennas 334*a-t*, transceivers 332*a-t*, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354*a-t*, antenna 352*a-t*, and/or other aspects described herein. Similarly, "receiving" may refer to various mechanisms of obtaining data, such as obtaining data from antennas 352*a-t*, transceivers 354*a-t*. RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

Figures 4A, 4B, 4C, 4D:
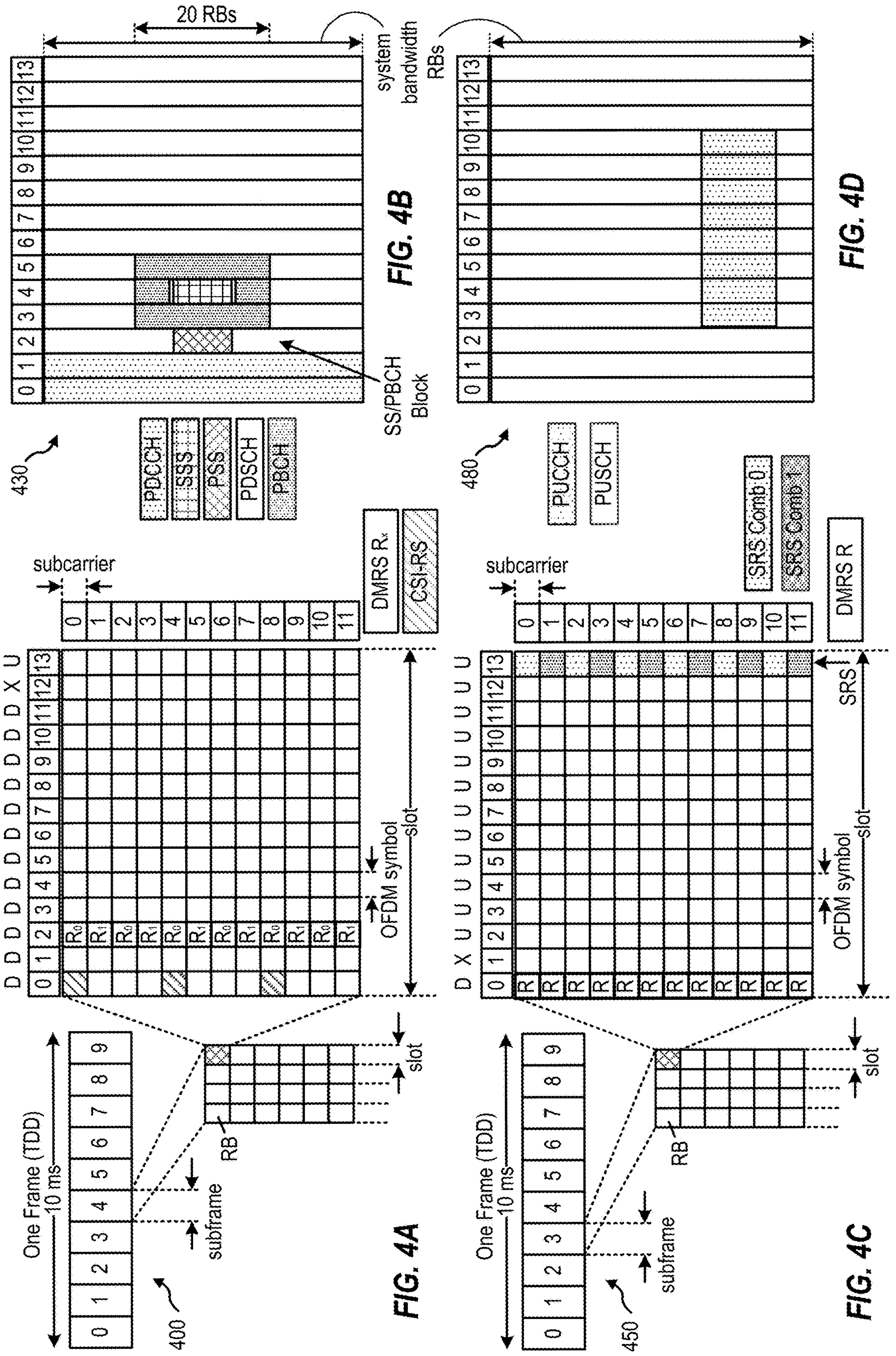
FIGS. 4A, 4B, 4C, and 4D depict various example aspects of data structures for a wireless communications network.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where Dis DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies (μ) 0 to 6 allow for 1, 2, 4, 8, 16, 32, and 64 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2μ slots/subframe. The subcarrier spacing and symbol length/duration are a function of the numerology. The subcarrier spacing may be equal to 24× 15 kHz, where μ is the numerology 0 to 6. As such, the numerology μ=0 has a subcarrier spacing of 15 kHz and the numerology μ=6 has a subcarrier spacing of 960 kHz. The symbol length/duration is inversely related to the subcarrier spacing. FIGS. 4A, 4B, 4C, and 4D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Reception of 2-layer DL MIMO signals may utilize beam reception from a single network entity (e.g., a TRP). The UE may be equipped with a single antenna panel and receive the 2-layer DL MIMO signal over a single receive beam.

Reception of 4-layer DL MIMO signals may utilize beam reception from at least two directions in FR2. A UE may simultaneously receive via multiple beams in order to receive from the at least two directions.

A UE simultaneously receiving multiple beams may simultaneously receive DL signals having different quasi-collocated (QCL) TypeD reference signals (RSs) on a single component carrier.

A UE may also measure CSI-RS using 2 TCIs and a Rel-17 multi-TRP (mTRP) Type I codebook.

It is therefore desirable to develop techniques for processing multi-layer transmissions simultaneously received from multiple network entities.

Aspects Related to Processing Multi-Layer Transmissions Simultaneously Received from Multiple Network Entities Aspects of the present disclosure provide methods, apparatuses, processing systems, and computer-readable media for determining correlation models for receiving multi-layer transmissions simultaneously from multiple network entities. For example, aspects of the present disclosure may provide methods, apparatuses, processing systems, and computer-readable media for a UE to determine a correlation model for receiving a four-layer transmission from a first TRP and a second TRP received via a first antenna panel and a second antenna panel at the UE.

Figure 5:
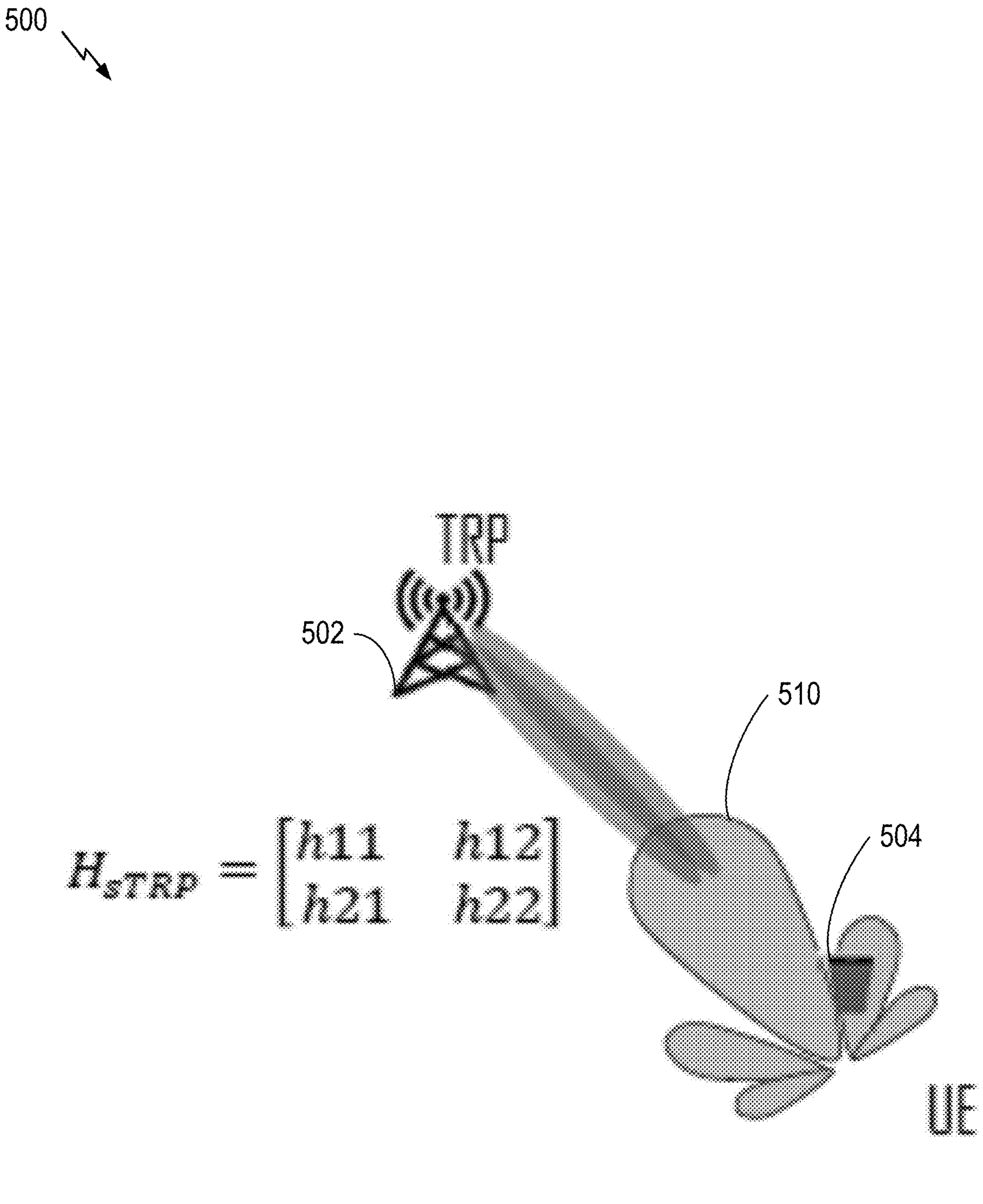
FIG. 5 shows an example communications system operating in frequency range 2 (FR2).

FIG. 5 shows an example communications system 500 operating in FR2, according to aspects of the present disclosure. The example communications system 500 includes a single TRP 502 transmitting to a UE 504 via a MIMO channel from 2 transmit antennas to 2 receive antennas, i.e., a 2×2 MIMO channel. The UE 504 may receive the transmission via a single receive beam 510. A channel matrix, $H_{sTRP}$, for such a channel may be represented as $$H_{sTRP} = \begin{bmatrix} h11 & h12 \\ h21 & h22 \end{bmatrix},$$

where the first digit of each entry's name refers to a particular receive antenna and the second digit of each entry's name refers to a particular transmit antenna, i.e., "h12" refers to the channel from transmit antenna 2 to receive antenna 1.

For a single TRP case as shown in FIG. 5, a corresponding correlation matrix $R_{MIMO(sTRP)}$ may be a 4×4 matrix based on a transmit correlation coefficient parameter a, a receive correlation coefficient β, and a cross-polarization correlation coefficient γ, as described in 3GPP TS38.101-4; "3rd Generation Partnership Project; Technical Specification Group Radio Access Network; NR; User Equipment (UE) radio transmission and reception; Part 4: Performance requirements." However, for up to 4-layer reception for which a UE will receive simultaneous transmissions from at least two directions, existing specifications do not provide such a correlation model in the context of FR2, where simultaneous reception at multiple (e.g., two) UE antenna panels may enable up to four-layer reception.

Example Operations of Entities in a Communications Network

Figure 6:
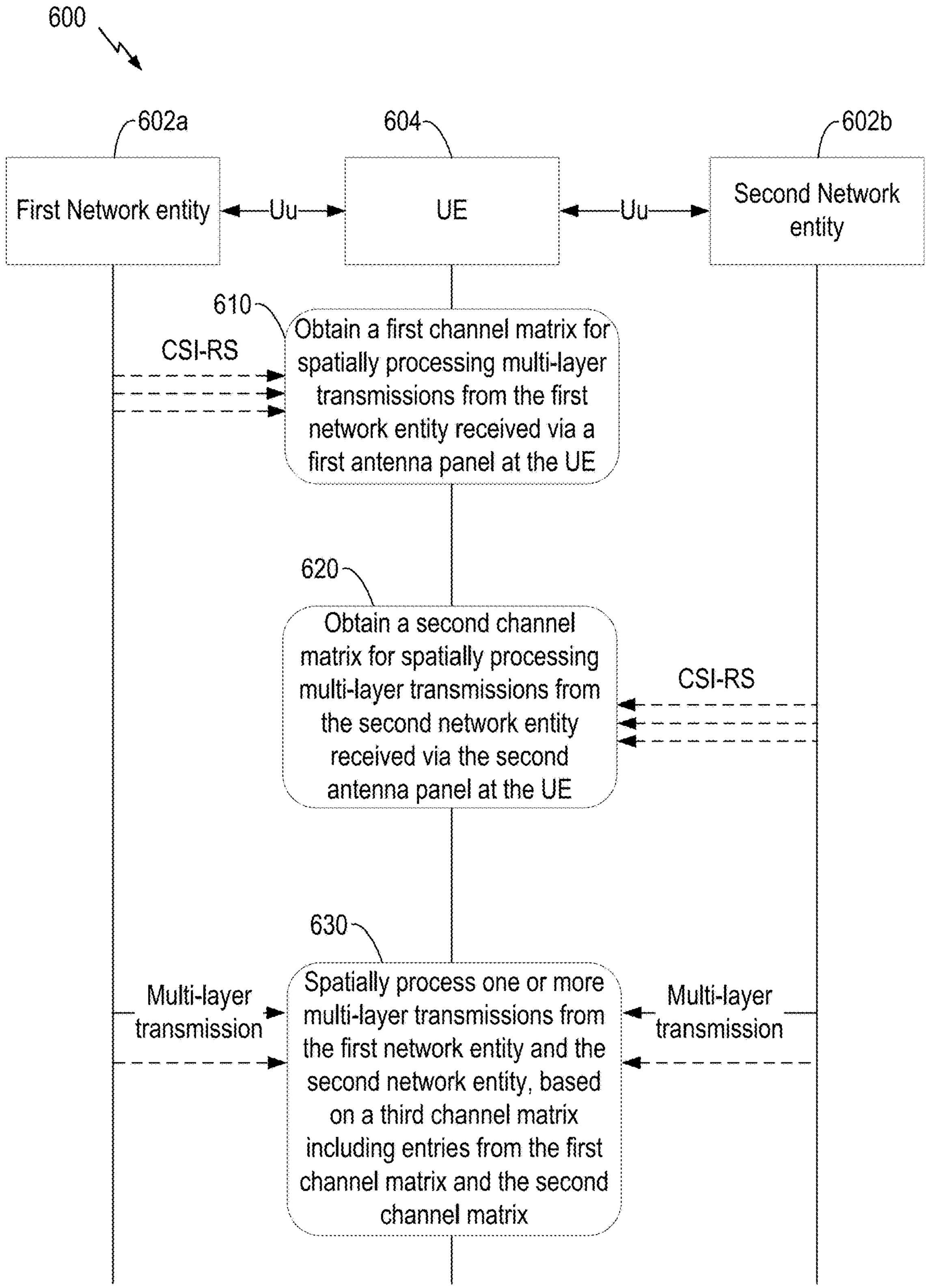
FIG. 6 depicts a process flow for communications in a network between a first network entity, a user equipment (UE), and a second network entity.

FIG. 6 depicts a process flow 600 for communications in a network between a first network entity 602*a*, a user equipment (UE) 604, and a second network entity 602*b*. In some aspects, the network entities 602*a* and 602*b* may be example of the BS 102 depicted and described with respect to FIGS. 1 and 3 or a disaggregated base station depicted and described with respect to FIG. 2. Similarly, the UE 604 may be an example of UE 104 depicted and described with respect to FIGS. 1 and 3. However, in other aspects, UE 604 may be another type of wireless communications device and the network entities 602*a* and 602*b* may other types of network entities or network nodes, such as TRPs or others described herein.

In the process flow 600, at 610, the UE 604 obtains a first channel matrix for spatially processing multi-layer transmissions from the first network entity 602*a* received via a first antenna panel at the UE 604. The UE may optionally obtain a first cross-talk matrix associated with the multi-layer transmissions from the first network entity 602*a* and a second antenna panel of the UE 604. The UE may optionally calculate the first channel matrix and the first cross-talk matrix based on one or more CSI-RS received from the first network entity 602*a*.

At 620, the UE 604 obtains a second channel matrix for spatially processing multi-layer transmissions from the second network entity 602*b* received via the second antenna panel at the UE 604. The UE may optionally obtain a second cross-talk matrix associated with the multi-layer transmissions from the second network entity 602*b* and the first antenna panel of the UE 604. The UE may optionally calculate the second channel matrix and the second cross-talk matrix based on one or more CSI-RS received from the second network entity 602*b*.

At 630, the UE spatially processes one or more multi-layer transmissions received from the first network entity 602*a* and the second network entity 602*b* via the first and second antenna panels at the UE, based on a third channel matrix including entries from the first channel matrix and the second channel matrix. The third channel matrix may also include entries from the first cross-talk matrix and the second cross-talk matrix. The one or more-multi-layer transmissions may include, for example, a 2-layer transmission from the first network entity 602*a* and a 2-layer transmission from the second network entity 602*b*, or a 4-layer transmission from a combination of the first network entity 602*a* and the second network entity 602*b*.

Aspects of the present disclosure provide a correlation model suitable for a UE to simultaneously receive via multiple antenna panels from multiple network entities in the context of FR2. The simultaneous reception via multiple antenna panels at the UE may enable up to 4-layer reception by the UE.

Determining a correlation matrix for spatially processing multi-layer transmissions simultaneously received from at least two directions via multiple antenna panels may enable a device (e.g., a UE) to spatially process multi-layer transmissions simultaneously received from at least two directions, enabling higher bandwidth and more reliable communications for the device.

Figure 7:
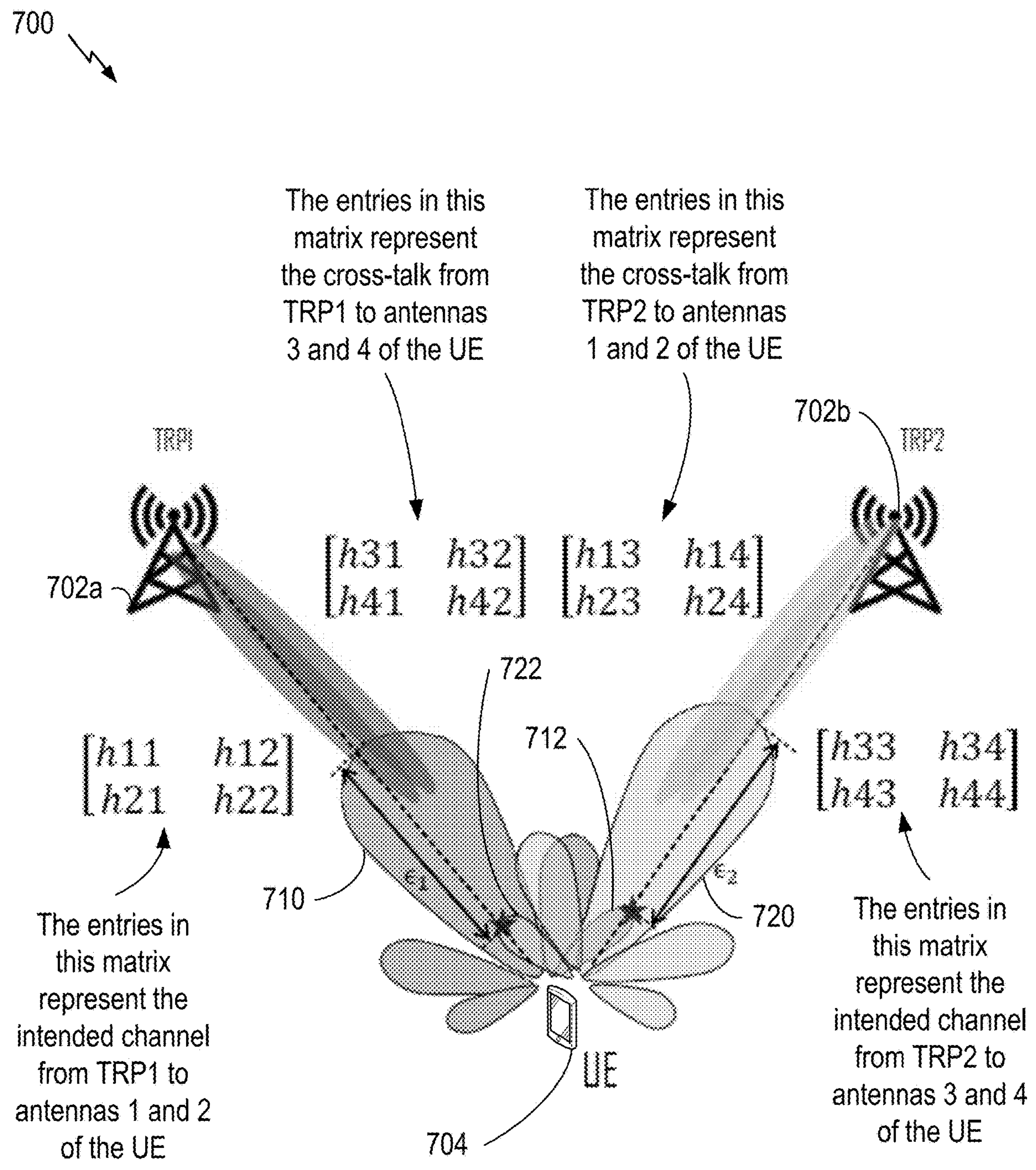
FIG. 7 shows an example communications system operating in FR2.

FIG. 7 shows an example communications system 700 operating in FR2, according to aspects of the present disclosure. The example communications system 700 includes first and second network entities 702*a* and 702*b* (e.g., TRPs), each transmitting from 2 transmit antennas to a UE 704. The UE has four receive antennas, and thus the two network entities and the UE communicate via a 4×4 MIMO channel. Two receive antennas of the UE may be grouped in a first antenna panel or a first antenna module and used by a first receiver (e.g., a receive chain) of the UE, and another two receive antennas of the UE may be grouped in a second antenna panel or a second antenna module and used by a second receiver (e.g., a receive chain) of the UE.

The UE 704 may receive the intended transmission from the first network entity 702*a* via a single receive beam 710 that may be associated with the antennas of the first antenna panel of the UE 704. A channel matrix for the intended channel from the first network entity may be represented as $$\begin{bmatrix} h11 & h12 \\ h21 & h22 \end{bmatrix},$$

with the entries of the matrix using the same naming convention as described above with reference to FIG. 5.

The UE 704 may also receive the intended transmission from the second network entity 702*b* via a single receive beam 720 that may be associated with the antennas of the second antenna panel of the UE 704. A channel matrix for the intended channel from the second network entity may be represented as $$\begin{bmatrix} h33 & h34 \\ h43 & h44 \end{bmatrix},$$

with the entries of the matrix using the same naming convention as described above with reference to FIG. 5.

The UE 704 may obtain the transmission from the second network entity 702*b* as cross-talk via the single receive beam 712 that may be associated with the antennas of the first antenna panel of the UE 704. A channel matrix or cross-talk matrix for this cross-talk may be represented as $$\begin{bmatrix} h13 & h14 \\ h23 & h24 \end{bmatrix},$$

with the entries of the matrix using the same naming convention as described above with reference to FIG. 5.

The UE 704 may also obtain the transmission from the first network entity 702*a* as cross-talk via the single receive beam 722 that may be associated with the antennas of the second antenna panel of the UE 704. A channel matrix or cross-talk matrix for this cross-talk may be represented as $$\begin{bmatrix} h31 & h32 \\ h41 & h42 \end{bmatrix},$$

with the entries of the matrix using the same naming convention as described above with reference to FIG. 5.

FIG. 7 also illustrates the cross-talk power that the UE 704 obtains while receiving the transmission. As illustrated, $\epsilon_1$ represents a first ratio of power of the intended channel from the first network entity 702*a* to the cross-talk power from the first network entity 702*a* to the second antenna panel of the UE 704, and E2 represents a second ratio of power of the intended channel from the second network entity 702*b* to the cross-talk power from the second network entity 702*b* to the first antenna panel of the UE 704.

According to aspects of the present disclosure, the overall MIMO channel matrix of the example communications system 700 shown in FIG. 7 can be written as:

$$H_{mTRP} = \begin{bmatrix} h11 & h12 & h13 & h14 \\ h21 & h22 & h23 & h24 \\ h31 & h32 & h33 & h34 \\ h41 & h42 & h43 & h44 \end{bmatrix} \quad (1)$$

In aspects of the present disclosure, techniques for calculating a correlation matrix for a single TRP, $R_{MIMO(sTRP)}$, may be used to derive an overall correlation matrix for a FR2 communications system in which a UE simultaneously receives from multiple network entities. According to aspects of the present disclosure, each of the transmission links, i.e., two desired links and two interfering (i.e., cross-talking) links (as described above with reference to FIG. 7) can be modelled as being a single TRP link that may be processed with a single TRP correlation matrix, $R_{MIMO(sTRP)}$.

According to aspects of the present disclosure, the channel matrix $H_{mTRP}$ in equation (1) may be rearranged as:

$$\tilde{H}_{mTRP} = \begin{bmatrix} h11 & h31 & h13 & h33 \\ h21 & h41 & h23 & h43 \\ h12 & h32 & h14 & h34 \\ h22 & h42 & h24 & h44 \end{bmatrix} \quad (2)$$

In aspects of the present disclosure, the rearranged channel matrix in equation (2) enables use of $R_{MIMO(sTRP)}$ for stacked channel coefficients represented via each column of the matrix in equation (2).

According to aspects of the present disclosure, correlation between the antenna modules at the UE, if any, may be neglected.

In aspects of the present disclosure, when the correlation between the antenna modules at the UE (if any) is neglected, correlation matrices for the desired links and the cross-talk links may be treated separately. Thus, the correlation matrix corresponding to each column of matrix $\tilde{H}_{mTRP}$ in equation (2) can be obtained in the same manner as calculating $R_{MIMO(sTRP)}$ for receiving a MIMO transmission from a single network entity (e.g., a TRP).

According to aspects of the present disclosure, the corresponding normalized MIMO channel, $h_{16\times1}$, with correlation matrices of each link $$R^{i,j}_{MIMO(sTRP)},\ i, j \in \{1, 2\},$$

may be calculated as:

$$h_{16\times1} = vec(\tilde{H}_{mTRP}) = \left[\left[\mathrm{diag}\left(\left[\frac{1}{1+\epsilon_1^2}\ \frac{\epsilon_1^2}{1+\epsilon_1^2}\ \frac{\epsilon_2^2}{1+\epsilon_2^2}\ \frac{1}{1+\epsilon_2^2}\right]\right)\otimes 1_4\right]\odot Blkdiag\left(\sqrt{R^{i,j}_{MIMO(sTRP)}}\right)\right]g_{16\times1} \quad (3)$$

where:

$1_n$ is a nxn matrix with all entries being ones, $\otimes$ denotes the Kronecker product, $\odot$ denotes point-by-point multiplication, diag denotes the diagonal elements of a diagonal matrix, Blkdiag denotes the diagonal elements of block diagonal matrix, $$R^{i,j}_{MIMO(sTRP)}$$

is a 4×4 correlation matrix for each of the four 2×2 links between two network entities (e.g., TRPs) to UE panels generated following the same procedure as in a single TRP case, i.e., $R_{MIMO(sTRP)}$ with a transmit correlation coefficient parameter, $\alpha$, a receive correlation coefficient parameter, $\beta$, and a cross-polarization correlation coefficient parameter, $\gamma$.

In aspects of the present disclosure, each element of a channel vector, $g_{16\times1}$, may be generated following independent and identically distributed Rayleigh fading.

Example Operations of a User Equipment

Figure 8:
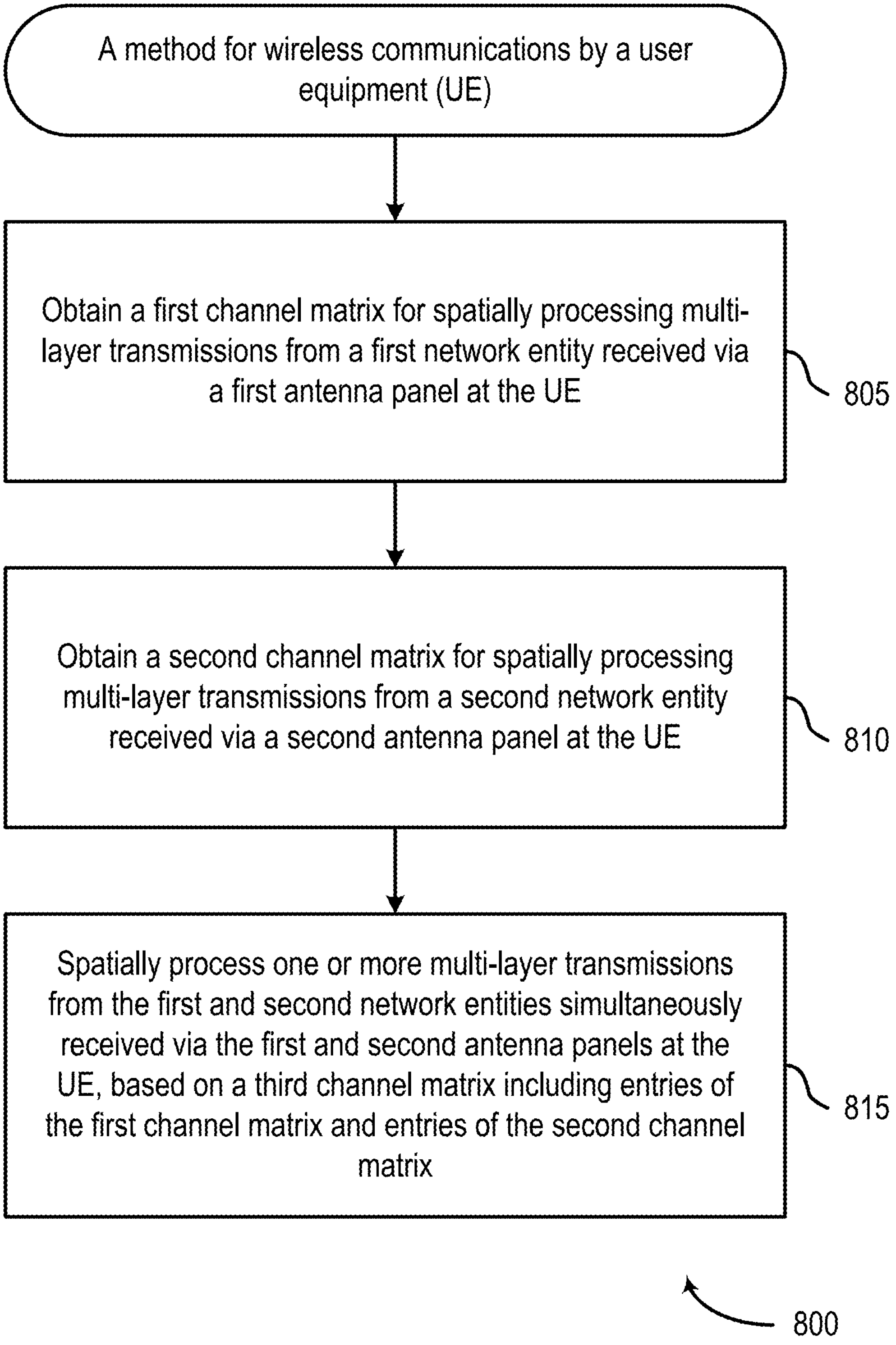
FIG. 8 depicts a method for wireless communications.

FIG. 8 shows an example of a method 800 of wireless communications by a user equipment (UE), such as a UE 104 of FIGS. 1 and 3.

Method 800 begins at step 805 with obtaining a first channel matrix for spatially processing multi-layer transmissions from a first network entity received via a first antenna panel at the UE. In some cases, the operations of this step refer to, or may be performed by, circuitry for obtaining and/or code for obtaining as described with reference to FIG. 9.

Method 800 then proceeds to step 810 with obtaining a second channel matrix for spatially processing multi-layer transmissions from a second network entity received via a second antenna panel at the UE. In some cases, the operations of this step refer to, or may be performed by, circuitry for obtaining and/or code for obtaining as described with reference to FIG. 9.

Method 800 then proceeds to step 815 with spatially processing one or more multi-layer transmissions from the first and second network entities simultaneously received via the first and second antenna panels at the UE, based on a third channel matrix including entries of the first channel matrix and entries of the second channel matrix. In some cases, the operations of this step refer to, or may be performed by, circuitry for spatially processing and/or code for spatially processing as described with reference to FIG. 9.

In some aspects, the third channel matrix further comprises: entries from a first cross-talk matrix associated with the multi-layer transmissions from the first network entity; and entries from a second cross-talk matrix associated with the multi-layer transmissions from the second network entity.

In some aspects, each column of the third channel matrix includes the entries of one of the first channel matrix, the second channel matrix, the first cross-talk matrix, or the second cross-talk matrix.

In some aspects, spatially processing the one or more multi-layer transmissions from the first and second network entities simultaneously received via the first and second antenna panels at the UE comprises: calculating a normalized multiple input multiple output (MIMO) channel matrix based on a first correlation matrix corresponding to a first column of the third channel matrix, a second correlation matrix corresponding to a second column of the third channel matrix, a third correlation matrix corresponding to a third column of the third channel matrix, and a fourth correlation matrix corresponding to a fourth column of the third channel matrix; and spatially processing the one or more multi-layer transmissions from the first and second network entities simultaneously received via the first and second antenna panels based on the normalized MIMO channel matrix.

In some aspects, the first antenna panel of the UE is associated with a first receiver of the UE; and the second antenna panel of the UE is associated with a second receiver of the UE.

In some aspects, the first network entity comprises a first transmission reception point (TRP); and the second network entity comprises a second TRP.

In some aspects, spatially processing the one or more multi-layer transmissions from the first and second network entities simultaneously received via the first and second antenna panels at the UE comprises: calculating a normalized multiple input multiple output (MIMO) channel matrix based on a first correlation matrix associated with the first channel matrix and a second correlation matrix associated with the second channel matrix; and spatially processing the one or more multi-layer transmissions from the first and second network entities simultaneously received via the first and second antenna panels based on the normalized MIMO channel matrix.

In some aspects, calculating the normalized MIMO channel matrix is further based on: a third correlation matrix associated with a first cross-talk matrix associated with the second antenna panel and the multi-layer transmissions from the first network entity; and a fourth correlation matrix associated with a second cross-talk matrix associated with the first antenna panel and the multi-layer transmissions from the second network entity.

In some aspects, entries of the first correlation matrix equal entries of a correlation matrix for a multi-layer transmission from the first network entity received via the first antenna panel at the UE; entries of the second correlation matrix equal entries of a correlation matrix for a multi-layer transmission from the second network entity received via the second antenna panel at the UE; entries of the third correlation matrix equal entries of a correlation matrix for a multi-layer transmission from the first network entity received via the second antenna panel at the UE; and entries of the fourth correlation matrix equal entries of a correlation matrix for a multi-layer transmission from the second network entity received via the first antenna panel at the UE.

In some aspects, calculating the normalized MIMO channel matrix is further based on: a first cross-talk power of the multi-layer transmissions from the first network entity at the second antenna panel; and a second cross-talk power of the multi-layer transmissions from the second network entity at the first antenna panel.

In some aspects, calculating the normalized MIMO channel matrix is further based on: a first ratio, $\epsilon_1$, of received power of the multi-layer transmissions from the first network entity at the first antenna panel to cross-talk power of the multi-layer transmissions from the first network entity at the second antenna panel; and a second ratio, $\epsilon_2$, of received power of the multi-layer transmissions from the second network entity at the second antenna panel to cross-talk power of the multi-layer transmissions from the second network entity at the first antenna panel.

Figure 9:
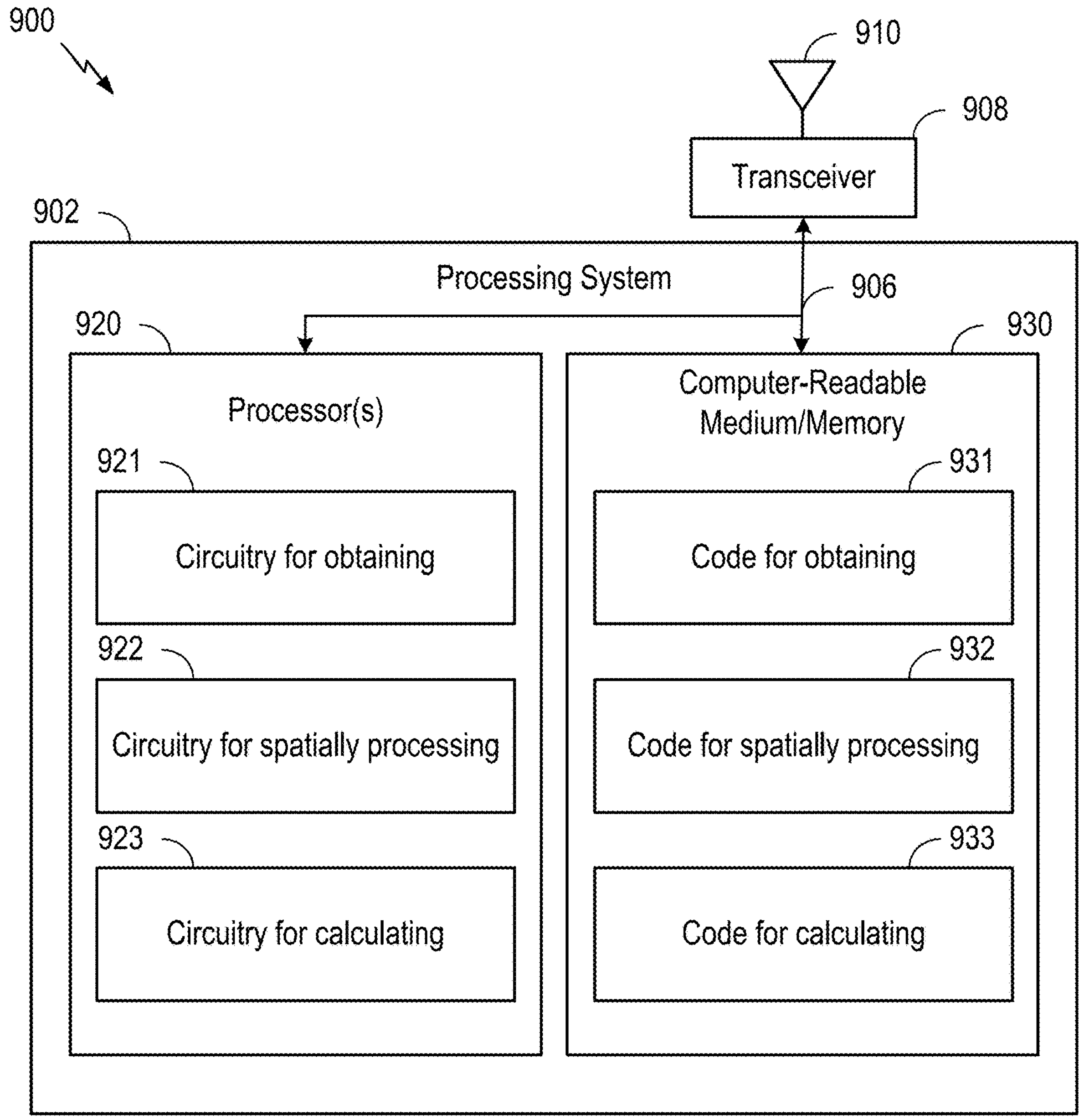
FIG. 9 depicts aspects of an example communications device.

In one aspect, method 800, or any aspect related to it, may be performed by an apparatus, such as communications device 900 of FIG. 9, which includes various components operable, configured, or adapted to perform the method 800. Communications device 900 is described below in further detail.

Note that FIG. 8 is just one example of a method, and other methods including fewer, additional, or alternative steps are possible consistent with this disclosure.

Example Communications Device(s)

FIG. 9 depicts aspects of an example communications device 900. In some aspects, communications device 900 is a user equipment, such as UE 104 described above with respect to FIGS. 1 and 3.

The communications device 900 includes a processing system 905 coupled to the transceiver 945 (e.g., a transmitter and/or a receiver). The transceiver 945 is configured to transmit and receive signals for the communications device 900 via the antenna 950, such as the various signals as described herein. The processing system 905 may be configured to perform processing functions for the communications device 900, including processing signals received and/or to be transmitted by the communications device 900.

The processing system 905 includes one or more processors 910. In various aspects, the one or more processors 910 may be representative of one or more of receive processor 358, transmit processor 364, TX MIMO processor 366, and/or controller/processor 380, as described with respect to FIG. 3. The one or more processors 910 are coupled to a computer-readable medium/memory 925 via a bus 940. In certain aspects, the computer-readable medium/memory 925 is configured to store instructions (e.g., computer-executable code or computer-executable instructions) that when executed by the one or more processors 910, cause the one or more processors 910 to perform the method 800 described with respect to FIG. 8, or any aspect related to it. Note that reference to a processor performing a function of communications device 900 may include one or more processors 910 performing that function of communications device 900.

In the depicted example, computer-readable medium/memory 925 stores code (e.g., computer-executable instructions), such as code for obtaining 930 and code for spatially processing 935. Processing of the code for obtaining 930 and code for spatially processing 935 may cause the communications device 900 to perform the method 800 described with respect to FIG. 8, or any aspect related to it.

The one or more processors 910 include circuitry configured to implement (e.g., execute) the code stored in the computer-readable medium/memory 925, including circuitry such as circuitry for obtaining 915 and circuitry for spatially processing 920. Processing with circuitry for obtaining 915 and circuitry for spatially processing 920 may cause the communications device 900 to perform the method 800 described with respect to FIG. 8, or any aspect related to it.

Various components of the communications device 900 may provide means for performing the method 800 described with respect to FIG. 8, or any aspect related to it. For example, means for transmitting, sending or outputting for transmission may include transceivers 354 and/or antenna(s) 352 of the UE 104 illustrated in FIG. 3 and/or the transceiver 945 and the antenna 950 of the communications device 900 in FIG. 9. Means for receiving or obtaining may include transceivers 354 and/or antenna(s) 352 of the UE 104 illustrated in FIG. 3 and/or the transceiver 945 and the antenna 950 of the communications device 900 in FIG. 9.

Example Clauses

Implementation examples are described in the following numbered clauses:

Clause 1: A method for wireless communications by a user equipment (UE), comprising: obtaining a first channel matrix for spatially processing multi-layer transmissions from a first network entity received via a first antenna panel at the UE; obtaining a second channel matrix for spatially processing multi-layer transmissions from a second network entity received via a second antenna panel at the UE; and spatially processing one or more multi-layer transmissions from the first and second network entities simultaneously received via the first and second antenna panels at the UE, based on a third channel matrix including entries of the first channel matrix and entries of the second channel matrix.

Clause 2: The method of Clause 1, wherein the third channel matrix further comprises: entries from a first cross-talk matrix associated with the multi-layer transmissions from the first network entity; and entries from a second cross-talk matrix associated with the multi-layer transmissions from the second network entity.

Clause 3: The method of Clause 2, wherein: each column of the third channel matrix includes the entries of one of the first channel matrix, the second channel matrix, the first cross-talk matrix, or the second cross-talk matrix.

Clause 4: The method of Clause 3, wherein spatially processing the one or more multi-layer transmissions from the first and second network entities simultaneously received via the first and second antenna panels at the UE comprises: calculating a normalized multiple input multiple output (MIMO) channel matrix based on a first correlation matrix corresponding to a first column of the third channel matrix, a second correlation matrix corresponding to a second column of the third channel matrix, a third correlation matrix corresponding to a third column of the third channel matrix, and a fourth correlation matrix corresponding to a fourth column of the third channel matrix; and spatially processing the one or more multi-layer transmissions from the first and second network entities simultaneously received via the first and second antenna panels based on the normalized MIMO channel matrix.

Clause 5: The method of any one of Clauses 1-4, wherein: the first antenna panel of the UE is associated with a first receiver of the UE; and the second antenna panel of the UE is associated with a second receiver of the UE.

Clause 6: The method of any one of Clauses 1-5, wherein: the first network entity comprises a first transmission reception point (TRP); and the second network entity comprises a second TRP.

Clause 7: The method of any one of Clauses 1-6, wherein spatially processing the one or more multi-layer transmissions from the first and second network entities simultaneously received via the first and second antenna panels at the UE comprises: calculating a normalized multiple input multiple output (MIMO) channel matrix based on a first correlation matrix associated with the first channel matrix and a second correlation matrix associated with the second channel matrix; and spatially processing the one or more multi-layer transmissions from the first and second network entities simultaneously received via the first and second antenna panels based on the normalized MIMO channel matrix.

Clause 8: The method of Clause 7, wherein calculating the normalized MIMO channel matrix is further based on: a third correlation matrix associated with a first cross-talk matrix associated with the second antenna panel and the multi-layer transmissions from the first network entity; and a fourth correlation matrix associated with a second cross-talk matrix associated with the first antenna panel and the multi-layer transmissions from the second network entity.

Clause 9: The method of Clause 8, wherein: entries of the first correlation matrix equal entries of a correlation matrix for a multi-layer transmission from the first network entity received via the first antenna panel at the UE; entries of the second correlation matrix equal entries of a correlation matrix for a multi-layer transmission from the second network entity received via the second antenna panel at the UE; entries of the third correlation matrix equal entries of a correlation matrix for a multi-layer transmission from the first network entity received via the second antenna panel at the UE; and entries of the fourth correlation matrix equal entries of a correlation matrix for a multi-layer transmission from the second network entity received via the first antenna panel at the UE.

Clause 10: The method of Clause 7, wherein calculating the normalized MIMO channel matrix is further based on: a first cross-talk power of the multi-layer transmissions from the first network entity at the second antenna panel; and a second cross-talk power of the multi-layer transmissions from the second network entity at the first antenna panel.

Clause 11: The method of Clause 7, wherein calculating the normalized MIMO channel matrix is further based on: a first ratio, $\epsilon_1$, of received power of the multi-layer transmissions from the first network entity at the first antenna panel to cross-talk power of the multi-layer transmissions from the first network entity at the second antenna panel; and a second ratio, $\epsilon_2$, of received power of the multi-layer transmissions from the second network entity at the second antenna panel to cross-talk power of the multi-layer transmissions from the second network entity at the first antenna panel.

Clause 12: An apparatus, comprising: a memory comprising executable instructions; and a processor configured to execute the executable instructions and cause the apparatus to perform a method in accordance with any one of Clauses 1-11.

Clause 13: An apparatus, comprising means for performing a method in accordance with any one of Clauses 1-11.

Clause 14: A non-transitory computer-readable medium comprising executable instructions that, when executed by a processor of an apparatus, cause the apparatus to perform a method in accordance with any one of Clauses 1-11.

Clause 15: A computer program product embodied on a computer-readable storage medium comprising code for performing a method in accordance with any one of Clauses 1-11.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, "a processor," "at least one processor," or "one or more processors" generally refers to a single processor configured to perform one or multiple operations or multiple processors configured to collectively perform one or more operations. In the case of multiple processors, performance of the one or more operations could be divided amongst different processors, though one processor may perform multiple operations, and multiple processors could collectively perform a single operation. Similarly, "a memory," "at least one memory." or "one or more memories" generally refers to a single memory configured to store data and/or instructions or multiple memories configured to collectively store data and/or instructions.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112 (f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus configured for wireless communications at a user equipment (UE), comprising:
- at least one memory comprising computer-executable instructions; and
- one or more processors configured to execute the computer-executable instructions and cause the UE to:
  - obtain a first channel matrix for spatially processing multi-layer transmissions from a first network entity received via a first antenna panel at the UE;
  - obtain a second channel matrix for spatially processing multi-layer transmissions from a second network entity received via a second antenna panel at the UE; and
  - spatially process one or more multi-layer transmissions from the first and second network entities simultaneously received via the first and second antenna panels at the UE, based on a third channel matrix including entries of the first channel matrix and entries of the second channel matrix, wherein the third channel matrix further comprises:
    - entries from a first cross-talk matrix associated with the multi-layer transmissions from the first network entity; and
    - entries from a second cross-talk matrix associated with the multi-layer transmissions from the second network entity.

2. The apparatus of claim 1, wherein:
- each column of the third channel matrix includes the entries of one of the first channel matrix, the second channel matrix, the first cross-talk matrix, or the second cross-talk matrix.

3. The apparatus of claim 2, wherein the one or more processors being configured to spatially process the one or more multi-layer transmissions from the first and second network entities simultaneously received via the first and second antenna panels at the UE comprises the one or more processors being configured to:
- calculate a normalized multiple input multiple output (MIMO) channel matrix based on a first correlation matrix corresponding to a first column of the third channel matrix, a second correlation matrix corresponding to a second column of the third channel matrix, a third correlation matrix corresponding to a third column of the third channel matrix, and a fourth correlation matrix corresponding to a fourth column of the third channel matrix; and
- spatially process the one or more multi-layer transmissions from the first and second network entities simultaneously received via the first and second antenna panels based on the normalized MIMO channel matrix.

4. The apparatus of claim 1, wherein:
- the first antenna panel of the UE is associated with a first receiver of the UE; and
- the second antenna panel of the UE is associated with a second receiver of the UE.

5. The apparatus of claim 1, wherein:
- the first network entity comprises a first transmission reception point (TRP); and
- the second network entity comprises a second TRP.

6. The apparatus of claim 1, wherein the one or more processors being configured to spatially process the one or more multi-layer transmissions from the first and second network entities simultaneously received via the first and second antenna panels at the UE comprises the one or more processors being configured to:
- calculate a normalized multiple input multiple output (MIMO) channel matrix based on a first correlation matrix associated with the first channel matrix and a second correlation matrix associated with the second channel matrix; and
- spatially process the one or more multi-layer transmissions from the first and second network entities simultaneously received via the first and second antenna panels based on the normalized MIMO channel matrix.

7. The apparatus of claim 6, wherein the one or more processors are further configured to calculate the normalized MIMO channel matrix based on:
- a third correlation matrix associated with a first cross-talk matrix associated with the second antenna panel and the multi-layer transmissions from the first network entity; and
- a fourth correlation matrix associated with a second cross-talk matrix associated with the first antenna panel and the multi-layer transmissions from the second network entity.

8. The apparatus of claim 7, wherein:
- entries of the first correlation matrix equal entries of a correlation matrix for a multi-layer transmission from the first network entity received via the first antenna panel at the UE;
- entries of the second correlation matrix equal entries of a correlation matrix for a multi-layer transmission from the second network entity received via the second antenna panel at the UE;
- entries of the third correlation matrix equal entries of a correlation matrix for a multi-layer transmission from the first network entity received via the second antenna panel at the UE; and
- entries of the fourth correlation matrix equal entries of a correlation matrix for a multi-layer transmission from the second network entity received via the first antenna panel at the UE.

9. The apparatus of claim 6, wherein the one or more processors are further configured to calculate the normalized MIMO channel matrix based on:
- a first cross-talk power of the multi-layer transmissions from the first network entity at the second antenna panel; and
- a second cross-talk power of the multi-layer transmissions from the second network entity at the first antenna panel.

10. The apparatus of claim 6, wherein the one or more processors are further configured to calculate the normalized MIMO channel matrix based on:
- a first ratio, $\epsilon_1$, of received power of the multi-layer transmissions from the first network entity at the first antenna panel to cross-talk power of the multi-layer transmissions from the first network entity at the second antenna panel; and
- a second ratio, $\epsilon_2$, of received power of the multi-layer transmissions from the second network entity at the second antenna panel to cross-talk power of the multi-layer transmissions from the second network entity at the first antenna panel.

11. A method for wireless communications by a user equipment (UE), comprising:

obtaining a first channel matrix for spatially processing multi-layer transmissions from a first network entity received via a first antenna panel at the UE;

obtaining a second channel matrix for spatially processing multi-layer transmissions from a second network entity received via a second antenna panel at the UE; and spatially processing one or more multi-layer transmissions from the first and second network entities simultaneously received via the first and second antenna panels at the UE, based on a third channel matrix including entries of the first channel matrix and entries of the second channel matrix, wherein the third channel matrix further comprises:

entries from a first cross-talk matrix associated with the multi-layer transmissions from the first network entity; and entries from a second cross-talk matrix associated with the multi-layer transmissions from the second network entity.

12. The method of claim 11, wherein:

each column of the third channel matrix includes the entries of one of the first channel matrix, the second channel matrix, the first cross-talk matrix, or the second cross-talk matrix.

13. The method of claim 12, wherein spatially processing the one or more multi-layer transmissions from the first and second network entities simultaneously received via the first and second antenna panels at the UE comprises:

calculating a normalized multiple input multiple output (MIMO) channel matrix based on a first correlation matrix corresponding to a first column of the third channel matrix, a second correlation matrix corresponding to a second column of the third channel matrix, a third correlation matrix corresponding to a third column of the third channel matrix, and a fourth correlation matrix corresponding to a fourth column of the third channel matrix; and spatially processing the one or more multi-layer transmissions from the first and second network entities simultaneously received via the first and second antenna panels based on the normalized MIMO channel matrix.

14. The method of claim 11, wherein spatially processing the one or more multi-layer transmissions from the first and second network entities simultaneously received via the first and second antenna panels at the UE comprises:

calculating a normalized multiple input multiple output (MIMO) channel matrix based on a first correlation matrix associated with the first channel matrix and a second correlation matrix associated with the second channel matrix; and spatially processing the one or more multi-layer transmissions from the first and second network entities simultaneously received via the first and second antenna panels based on the normalized MIMO channel matrix.

15. The method of claim 14, wherein calculating the normalized MIMO channel matrix is further based on:

a third correlation matrix associated with a first cross-talk matrix associated with the second antenna panel and the multi-layer transmissions from the first network entity; and a fourth correlation matrix associated with a second cross-talk matrix associated with the first antenna panel and the multi-layer transmissions from the second network entity.

16. The method of claim 15, wherein:

entries of the first correlation matrix equal entries of a correlation matrix for a multi-layer transmission from the first network entity received via the first antenna panel at the UE;

entries of the second correlation matrix equal entries of a correlation matrix for a multi-layer transmission from the second network entity received via the second antenna panel at the UE;

entries of the third correlation matrix equal entries of a correlation matrix for a multi-layer transmission from the first network entity received via the second antenna panel at the UE; and entries of the fourth correlation matrix equal entries of a correlation matrix for a multi-layer transmission from the second network entity received via the first antenna panel at the UE.

17. The method of claim 14, wherein calculating the normalized MIMO channel matrix is further based on:

a first cross-talk power of the multi-layer transmissions from the first network entity at the second antenna panel; and a second cross-talk power of the multi-layer transmissions from the second network entity at the first antenna panel.

18. A non-transitory computer-readable medium comprising computer-executable instructions that, when executed by a processor of a user equipment (UE), cause the UE to perform a method of wireless communications, comprising:

obtaining a first channel matrix for spatially processing multi-layer transmissions from a first network entity received via a first antenna panel at the UE;

obtaining a second channel matrix for spatially processing multi-layer transmissions from a second network entity received via a second antenna panel at the UE; and spatially processing one or more multi-layer transmissions from the first and second network entities simultaneously received via the first and second antenna panels at the UE, based on a third channel matrix including entries of the first channel matrix and entries of the second channel matrix, wherein the third channel matrix further comprises:

entries from a first cross-talk matrix associated with the multi-layer transmissions from the first network entity; and entries from a second cross-talk matrix associated with the multi-layer transmissions from the second network entity.

* * * * *